United States Patent [19]

Collonia

[11] 4,352,402
[45] Oct. 5, 1982

[54] SAFETY CIRCUIT FOR AN APPARATUS FOR REGULATING THE TRAVELING SPEED OF A VEHICLE

[75] Inventor: Harald Collonia, Glashütten, Fed. Rep. of Germany

[73] Assignee: VDO Adolf Schindling AG, Fed. Rep. of Germany

[21] Appl. No.: 160,866

[22] Filed: Jun. 19, 1980

[30] Foreign Application Priority Data

Jun. 25, 1979 [DE] Fed. Rep. of Germany ....... 2925580

[51] Int. Cl.³ .............................................. B60K 31/00
[52] U.S. Cl. .................................... 180/170; 123/350; 123/352; 180/176; 180/179
[58] Field of Search ............... 180/179, 178, 177, 176, 180/174, 170, 175, 171, 172, 173; 123/352, 353, 360, 361, 320, 349, 325, 324

[56] References Cited

U.S. PATENT DOCUMENTS

| 3,455,411 | 7/1969 | Carp et al. | 180/176 |
| 3,946,707 | 3/1976 | Gray | 180/176 X |
| 4,084,659 | 4/1978 | Abend et al. | 180/179 |
| 4,159,753 | 7/1979 | Boche | 180/170 |

Primary Examiner—Joseph F. Peters, Jr.
Assistant Examiner—Milton L. Smith
Attorney, Agent, or Firm—Eric P. Schellin

[57] ABSTRACT

An apparatus for regulating the traveling speed of a motor vehicle has a regulating device connected to control the fuel-air mixture supplied to the vehicle engine, with a safety circuit including a switching-off device responsive to a prespecified deceleration of the vehicle to deactuate the regulating device.

7 Claims, 1 Drawing Figure

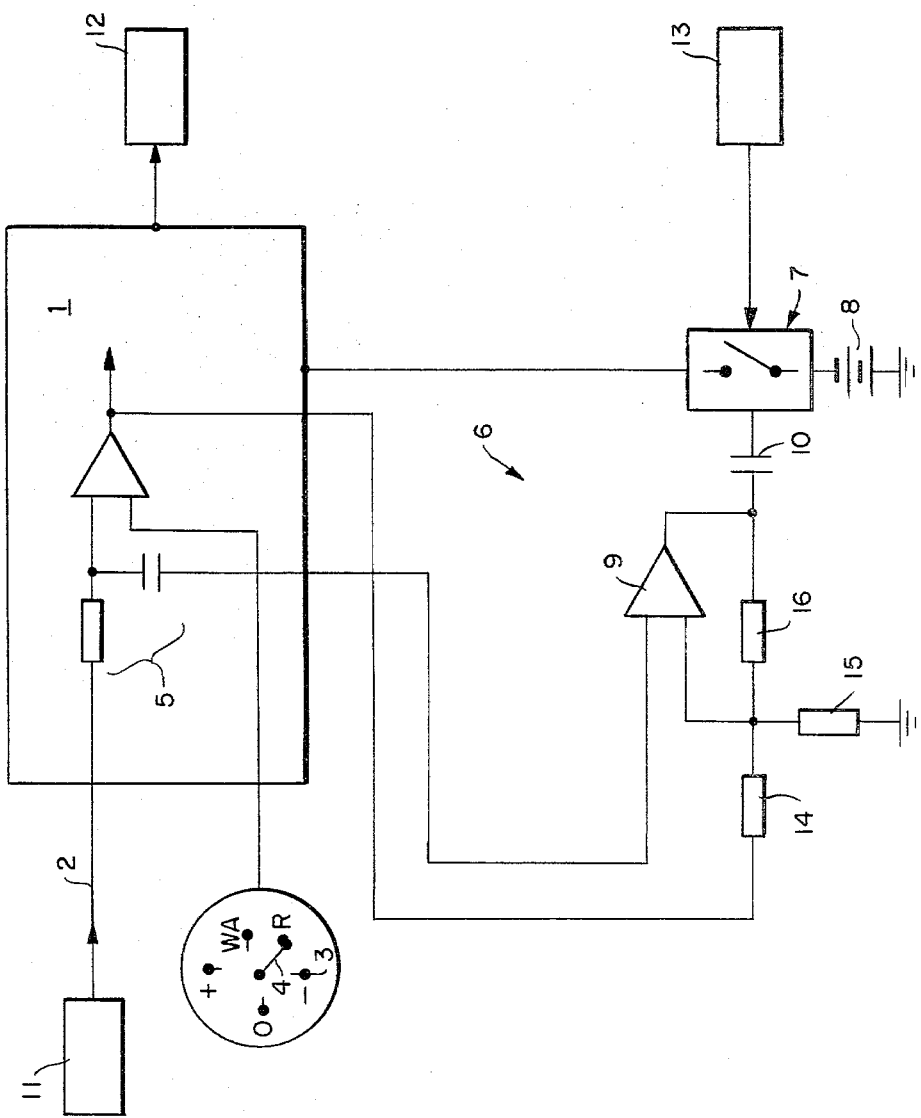

SAFETY CIRCUIT FOR AN APPARATUS FOR REGULATING THE TRAVELING SPEED OF A VEHICLE

BACKGROUND OF THE INVENTION

1. Field of the Invention

The invention relates to an apparatus for regulating the traveling speed of a motor vehicle, comprising a regulator whose control unit is in operative connection with an element controlling the ratio of the fuel-air mixture fed to the vehicle engine, especially the throttle valve, and has means for deactivating the regulator when the foot brake is applied including a switch turning on the brake or stop light, and is provided with a safety circuit operative to deactivate the regulator in the event the switch turning on the stop light, and thus switching off the regulating device, fails to function.

2. Prior Art

With relation to an automatic speed regulating system, it is already known that when a switch turning on the stop light and also switching off the regulating device fails to function, a blocking circuit is provided that responds to a prespecified speed change and thereupon switches off the regulating device (DE-OS No. 20 06 367). Such safety circuits, however, entail the disadvantage that at the failure of the stop light switch, the regulating device acts at least momentarily against the effect of the brake. This may lead, especially with high-powered vehicles, to dangerous situations. The known disadvantages cannot be eliminated by the provision of particularly closely tolerated switch thresholds, since the regulating device otherwise would be needlessly switched off at small irregularities of the travel speed.

SUMMARY OF THE INVENTION

A principal object of the invention is, therefore, to provide a better and more reliable safety circuit which supplements an existing regulating device without substantial structural change and expense. Particularly, the device is to operate without additional and independent transmitters.

This object is achieved, in a device of the foregoing type, by modification of a regulating device which is disabled by a threshold value switch when a prespecified vehicle deceleration brought about by the foot brake is exceeded.

A special advantage of the invention consists in that the acceleration threshold, which is independent of the speed, can be adjusted to closer tolerances, so that the regulator can also be released by the actuation of the hand brake. The latter fact is particularly advantageous in the event of a failure of the foot brake circuit. Moreover, such an embodiment does not operate as sluggishly as the known solutions, which means that the regulating device cannot cause the engine to counteract the brake.

A particularly advantageous development of the invention consists in the switching-off device being also connected to a speed-independent electric signal that is provided for the adjustment of other operations since such signals are present anyway and can be utilized along with the aforementioned function.

A particularly reliable advantageous development of the invention consists of a threshold value switch with a switch threshold for switching off the regulating device when a vehicle deceleration of one meter per second square is being exceeded, since the effect of travel path changes, according to experience, remains below this threshold.

A further advantageous development of the invention consists in that the threshold value switch has further, more closely limited switch thresholds for the actuation of further safety devices, so that the signal of the threshold value switch can also be utilized for other systems, e.g., the blocking device of the safety belts.

A special advantage of the invention consists also in the fact that the switching-off device is independent of other switching-off systems which respond to a change in the number of revolutions or in the power of the engine. Other safety systems may remain and are effectively supplemented by the new circuit without having to replace them.

A particularly advantageous development of the invention is seen in the fact that the switching-off device consists of a sum-and-difference amplifier, to whose first input is applied a speed-dependent signal, and to whose second input is applied an electric signal dimensionable by means of a voltage divider chain, and whose output signal is fed via a condenser to a switching-off disconnect or memory. A particularly reliable switching-off or disconnect memory acts in this structure directly upon the current supply of the regulating device and prevents, by the storing of the switching-off signal, an immediate erroneous re-switching on.

BRIEF DESCRIPTION OF THE DRAWINGS

Further developments of the invention are explained in greater detail with the aid of the embodiments shown diagrammatically in the single FIGURE of the drawing, by way of example.

DETAILED DESCRIPTION OF THE PREFERRED EMBODIMENTS

The regulating device shown is combined in block 1 to which a speed signal is fed via a line 2 from a vehicle speed signal generator 11. The operation of regulating device 1 is controllable from an operating unit 3 in which five switching positions are shown. The switching arm 4 of the control unit, which in this case is constructed as a rotary switch, is in position R wherein the speed prevailing at the instant concerned is stored in regulating device 1, which functions to minimize deviation in vehicle speed from the regulated speed by supply of an error signal to an engine throttle control device 12.

From operating unit 3 the regulated speed can also be manually decreased in position "−", and increased in position "+". It is also known to provide a position "WA" wherein the vehicle speed is by regulation increased or decreased to a stored value which, for technical reasons relating to traveling, could temporarily not be maintained. Finally, it is possible to switch off the entire apparatus by means of the operating unit in position O.

The regulating device is also to be switched off when the operating unit is in the position R shown for that instant, and the driver applies the foot brake 13 or the hand brake, or when a particularly abrupt change in the travel path occurs.

The mode of operation of the stop light switch cooperating with the foot brake, for switching off a regulating device is well known in the prior art as disclosed for example in U.S. Pat. No. 4,084,659. Where the stop light switch fails to function in such prior art systems, the regulating device 1 is switched off through a threshold value switch 6 and the memory 7 when a specific speed threshold is exceeded, as a function of a set rated speed. Such thresholds are established in known devices in the range of 15 kilometers per hour. On account of the known disadvantages of such a safety circuit, namely: dependency on the direction; inaccuracy; and sluggishness (inertia) with a chance of undesired counterregulation, the regulating device in accordance with the present invention provided with a switching-off device depending on vehicle acceleration (or deceleration). A speed signal of the vehicle is for this purpose transformed into an acceleration signal by means of a differentiator 5, which acceleration signal acts via the threshold value switch 6 upon the switching-off memory 7. In the threshold value switch 6 an acceleration threshold is prespecified, preferably within the range of one meter per second square, beyond which the switching-off memory 7 switches off the current supply 8 of the regulating device 1. Of course, the switching-off memory 7 can also deactivate regulating device 1 in another manner, e.g. by resetting the operating unit to position O. Switching-off memory 7 after switching off operation, also prevents switch-on of the regulator, for safety reasons, for a prespecified period of time.

A particularly simple development of the acceleration-dependent switching off by means of the threshold value switch 6 is set by means of sum-and-difference amplifier 9 and a condenser 10 connected thereto. The operation range of sum-and-difference amplifier 9 is adjusted with respect to the speed signal arriving in line 2, by means of a voltage divider circuit including resistors 14, 15 and 16 establishing a reference signal at one of the inputs of amplifier 9 for comparison with the acceleration dependent signal applied to the other amplifier input as shown.

The acceleration-dependent threshold can, in contrast to the speed-dependent threshold, be much more closely limited since, as a function of time, it switches also for particularly short periods, so that regulating device 1 has no longer any chance of having the engine operate possibly against the effect of the brake, and therefore can also respond to a delay by the application of the hand brake. Of course, the new safety circuit device may also be provided in addition to other safety devices, so that existing regulating devices can continue to be utilized and can be easily supplemented by the structural elements necessary for carrying out the invention. Finally, the general desire of securing a technical device in a multiplicity of ways can thereby be complied with.

A particular advantage consists in that the rated speed is no longer the reference value but an acceleration value suitably associated with the speed prevailing at the instant concerned.

What we claim as new and desire to secure by United States Letters Patent is:

1. In a speed control system for a vehicle, comprising means (11) for generating a signal dependent on vehicle speed, an engine throttle control device (12), speed regulator means (1) connected to the signal generating means and the control device for regulating vehicle speed, a vehicle brake device (13), disconnect memory means (7) connected to the brake device and the regulator means for interrupting vehicle speed regulation by the regulator means in response to actuation of the brake device, and threshold switch means (6) connected to the disconnect memory means for preventing said vehicle speed regulation under control of said vehicle speed dependent signal, the improvement residing in means (5) connected to the regulator means for transforming the speed dependent signal into an acceleration dependent signal applied to the threshold switch means, said threshold switch means including amplifier means (9) to which said acceleration dependent signal is applied for disabling the regulator means in response to vehicle acceleration in excess of a predetermined threshold value, until reset.

2. The system as defined in claim 1 wherein said predetermined threshold value corresponds to deceleration of the vehicle by said actuation of the brake device of one meter per second squared.

3. The system as defined in claim 2 wherein said amplifier means includes a pair of inputs and an output, said acceleration dependent signal being applied to one of the inputs, reference means (13-15) connected to the other of the inputs for establishing said predetermined threshold value, and a capacitor (10) coupling the output to the disconnect memory means.

4. The system as defined in claim 3 including a power supply (8) connected to the regulator means, said disconnect memory means being operative to disconnect the power supply from the regulator means for preventing said vehicle speed regulation.

5. The system as defined in claim 1 wherein said amplifier means includes a pair of inputs and an output, said acceleration dependent signal being applied to one of the inputs, reference means (13-15) connected to the other of the inputs for establishing said predetermined threshold value, and a capacitor (10) coupling the output to the disconnect memory means.

6. The system as defined in claim 1 including a power supply (8) connected to the regulator means, said disconnect memory means being operative to disconnect the power supply from the regulator means for preventing said vehicle speed regulation.

7. The system as defined in claim 1 wherein said means for transforming the speed dependent signal comprises a signal differentiating circuit(s).

* * * * *